(12) United States Patent
Migliori

(10) Patent No.: US 7,290,816 B2
(45) Date of Patent: Nov. 6, 2007

(54) WORK PIECE GRIPPING DEVICE FOR ROBOTIZED MANIPULATING SYSTEMS

(75) Inventor: Luciano Migliori, Milan (IT)

(73) Assignee: Univer S.p.A., Milan (IT)

( * ) Notice: Subject to any disclaimer, the term of this patent is extended or adjusted under 35 U.S.C. 154(b) by 6 days.

(21) Appl. No.: 11/253,079

(22) Filed: Oct. 14, 2005

(65) Prior Publication Data

US 2006/0087138 A1 Apr. 27, 2006

(30) Foreign Application Priority Data

Oct. 21, 2004 (IT) .......................... MI2004A2003

(51) Int. Cl.
*B66C 1/42* (2006.01)

(52) U.S. Cl. ..................... 294/103.1; 294/88

(58) Field of Classification Search ................ 294/104, 294/106, 116, 101, 103.1
See application file for complete search history.

(56) References Cited

U.S. PATENT DOCUMENTS 4,728,137 A * 3/1988 Hamed et al. ................ 294/88

6,079,896 A 6/2000 Dellach
2002/0084564 A1 7/2002 Horn et al.

FOREIGN PATENT DOCUMENTS

| CA | 2458310 | 7/1998 |
| EP | 1122031 | 8/2001 |
| GB | 1456703 | 11/1976 |
| GB | 2222106 | 2/1990 |

* cited by examiner

*Primary Examiner*—Eileen D. Lillis
*Assistant Examiner*—Esther Onyinyechi Okezie
(74) *Attorney, Agent, or Firm*—Young & Thompson

(57) ABSTRACT

A gripping device for gripping work pieces which is connectable to a robotized manipulating system includes a box-shaped body for supporting a first and a second gripping member, at least one of which being angularly movable, and a linear actuator operatively connected to the movable gripping member by a toggle-lever mechanism. The toggle-lever mechanism in turn includes a first and a second articulated connecting link, angularly movable with respect to each other, pivotally connected to a control rod of the actuator, respectively to the angularly movable gripping member. The device also includes a guiding element for guiding the angular movement of the second connecting link, and a limiting element for limiting the relative angular movement between the first and the second connecting link.

12 Claims, 3 Drawing Sheets

WORK PIECE GRIPPING DEVICE FOR ROBOTIZED MANIPULATING SYSTEMS

BACKGROUND OF THE INVENTION

This invention concerns a gripping device for gripping work pieces, suitable for being connected to robotized systems for manipulating or handling work pieces, which can for example be used in the automotive field for constructing the bodywork of motor vehicles.

STATE OF THE ART

In general, in the automotive field, gripping devices are known and used for gripping or clamping sheet metal or work pieces in general, in order to allow them to be handled or manipulated by means of suitable robotized systems, for example of the anthropomorphic type, along any production or assembly line.

For example, U.S. Pat. No. 6,079,896 describes a known gripping device of the aforementioned kind, which comprises a box-shaped body, at least one gripping arm supported by the box-shaped body to perform an angular movement, and a control cam for controlling the gripping arm, operatively connected to a linear actuator; each gripping arm has a shaped sliding slot, designed to receive the control cam, which has arcuate surfaces designed to guide the angular movement of the gripping arm between a first and a second operative end positions, by a sliding movement of the cam along the arcuate surfaces of the slot.

A solution of this kind for a gripping device is structurally simple, but it has several functional drawbacks; in particular the control of the gripping arm by means of the cam and the shaped slot proves to be rather imprecise due to the inevitable slack existing in such a coupling.

Moreover, the movement of the cam along the shaped sliding slot generates frictional forces which limit the force that can be exerted by the gripping arm, and in the long run cause the wear of the sliding slot and of the control cam.

Furthermore, with a control cam and sliding slot of this kind it is not possible for the gripping arm to perform a wide angular movement, for example of about 90°, as required for several specific applications of the device, due to possible jamming of the control itself, with repercussions on the operating regularity and precision of the device.

A different solution is illustrated in U.S. Pat. No. 6,634,630, which describes a gripping device comprising a box-shaped body for supporting a first and a second gripping arms, angularly movable according to respective rotational axes and linearly movable along the box-shaped body of the device.

The device also comprises a linear actuator having a control rod operatively connected with the first and the second gripping arms by respective toggle-lever mechanisms; each toggle-lever mechanism comprises a connecting link pivotally connected between the control rod of the actuator and a link pin of the corresponding gripping arm, spaced apart from the rotational axis of the gripping arm.

In order to guide the angular and linear movement of each gripping arm, the box-shaped body is provided with a first and a second shaped slot into which respective cams are slidingly inserted, the cams being connected to the gripping arms in correspondence with the link pins for the connecting links of the toggle-lever mechanisms.

A device of this kind however has considerable overall dimensions both in the longitudinal and in the crosswise directions, due to the long axial stroke of the control rod, respectively to the length of the connecting links of the toggle-lever mechanisms, such features being necessary to achieve a sufficiently ample angular movement of the gripping arms.

Moreover, as in the case of the previously described gripping device, there are clearances and frictions between the sliding slots and the cams for guiding the movement of the gripping arms, with the result that the same movement is imprecise, and also gives rise to wear of the slots and the cams.

OBJECTS OF THE INVENTION

The main object of this invention is to provide a gripping device for gripping work pieces, connectable to robotized manipulating systems, which is structurally simple, and which is provided with at least one gripping member having an ample operative angular movement, the device having at the same time limited external overall dimensions.

A further object of this invention is to provide a gripping device of the aforementioned kind, which has a precise movement of the gripping member, thanks to the almost total absence of clearances between the internal members of the device, and which is able to exert high gripping forces on the work pieces, while at the same time limiting the wear of the aforesaid members inside the device.

A still further object of this invention is to provide a gripping device of the aforementioned kind, which allows to grip work pieces of different thickness, automatically compensating the thickness differences between the various work pieces.

BRIEF DESCRIPTION OF THE INVENTION

The foregoing can be achieved by means of a gripping device for gripping work pieces, connectable to a robotized manipulating system, of the type comprising:

a box-shaped body;

a first and a second gripping members, at least one of which being supported by the box-shaped body to be angularly movable between a first and a second operative end positions, according to a rotational axis; and a linear actuator having a longitudinally movable control rod, said movable gripping member being operatively connected to the control rod of the linear actuator by a toggle-lever mechanism, characterised in that said toggle-lever mechanism comprises:

a first and a second articulated connecting links, angularly movable with respect to each other, said first and second connecting links being pivotally connected to the control rod of the actuator, respectively to the angularly movable gripping member, said second connecting link being connected to the movable gripping member in an eccentric point with respect to its rotational axis;

in that guiding means are provided for guiding the angular movement of the second connecting link, said guiding means being shaped to guide said connecting link during the angular movement of the gripping member; and in that limiting means are provided for limiting the relative angular movement between said first and said second connecting links, in correspondence with said operative end positions.

BRIEF DESCRIPTION OF THE DRAWINGS

These and further features according to this invention will be more clearly evident from the following description with reference to the accompanying drawings, in which.

DETAILED DESCRIPTION OF THE INVENTION

The general features of this invention will be illustrated hereunder by means of several exemplificative embodiments.

Figure 1:
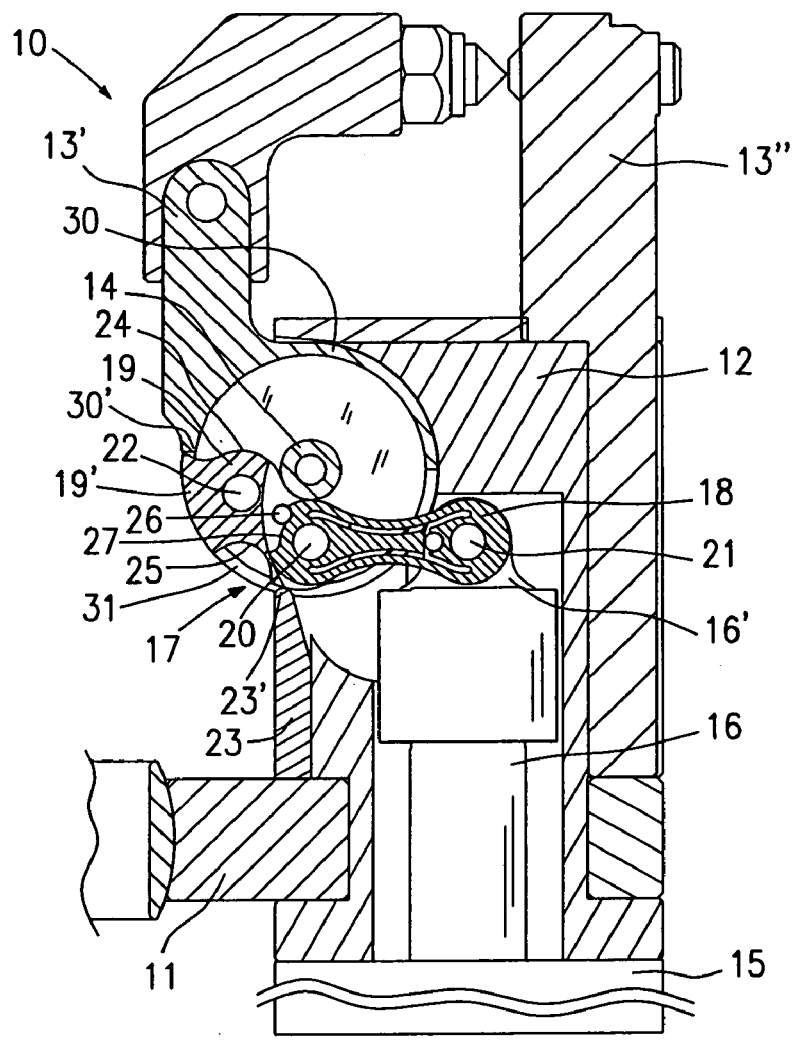
FIG. 1 shows a longitudinal cross-sectional view of a gripping device according to a first embodiment of the invention, having a single movable gripping member shown in the retaining position for the work pieces.
Figure 2:
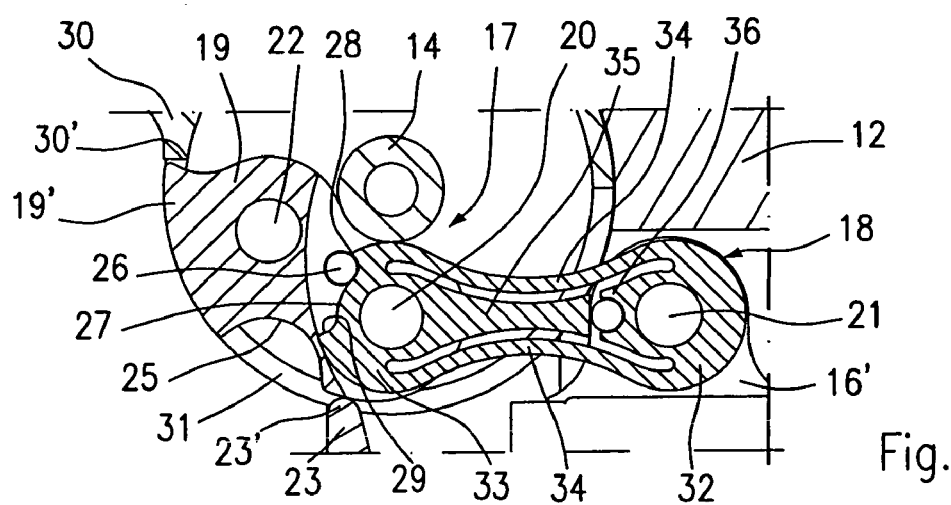
FIG. 2 shows an enlarged detail of FIG. 1.
Figure 3:
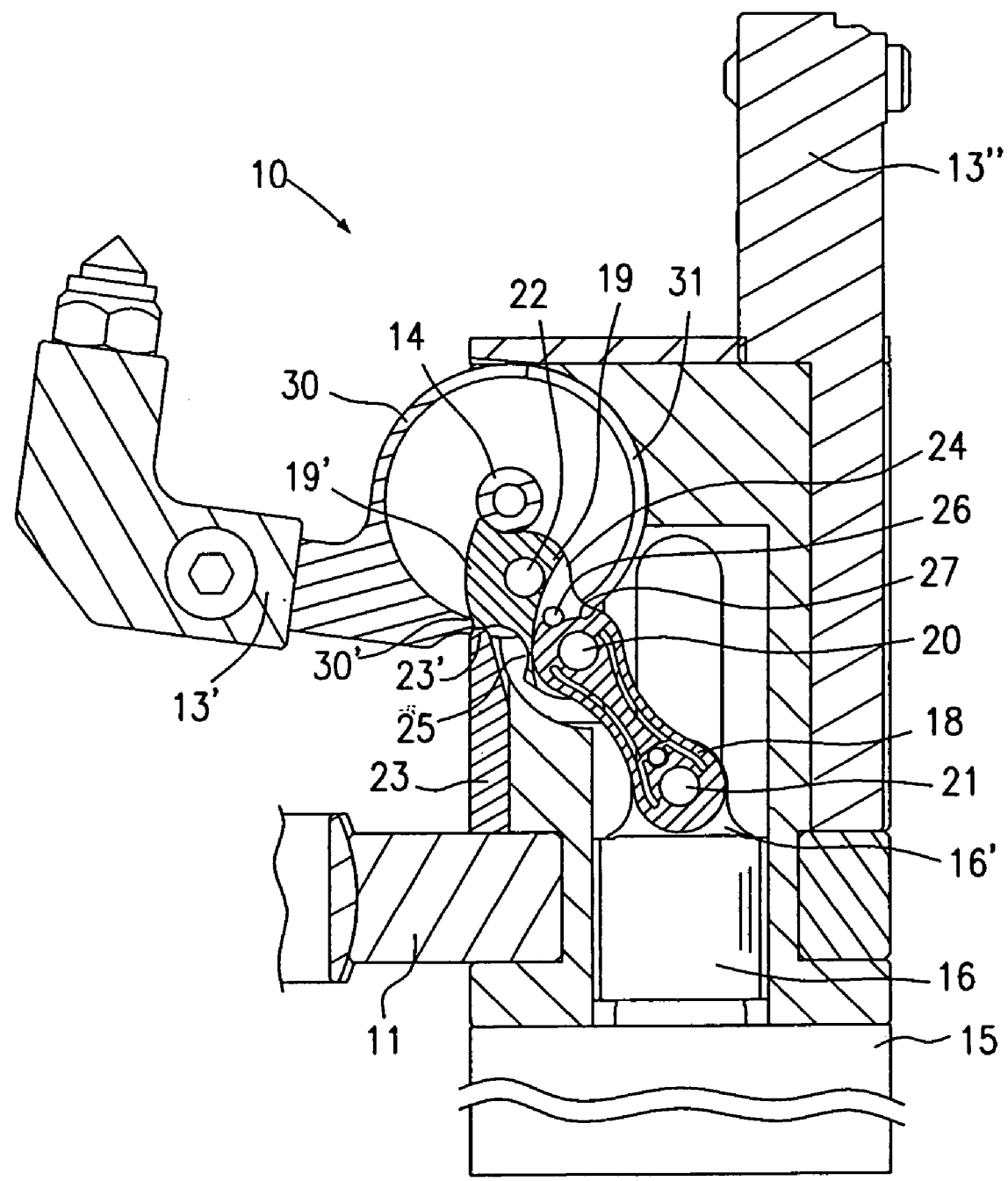
FIG. 3 shows a longitudinal cross-sectional view of the gripping device of FIG. 1, having the movable gripping member shown in a release position for the work pieces.

FIGS. 1, 2 and 3 show a first embodiment of a gripping device for gripping work pieces according to the invention.

The gripping device, indicated as a whole by reference number 10, is particularly suitable to be connected to a robotized system for manipulating or handling work pieces, not shown, for example by means of a supporting bracket 11 secured to the device 10 itself.

The gripping device 10 comprises a box-shaped body 12, extending according to a longitudinal axis, which supports a first and a second gripping member 13', 13", at least one 13' of which is supported to be angularly movable, according to a rotational axis, between a first operative end position, in which it retains a work piece against the second gripping member 13", and a second operative position in which it releases the work piece.

In particular, the device 10 illustrated in FIGS. 1 and 2 comprises an angularly movable gripping member 13', having a rotational axis defined by a pin 14 supported at a fore end on a side of the box-shaped body 12, and a fixed or stationary gripping member 13", secured to the box-shaped body 12 by suitable fastening means, not shown, at the fore end of the box-shaped body 12 on a side opposite to the movable gripping member 13' with respect to the longitudinal axis of the box-shaped body 12.

The device 10 also comprises a linear actuator 15, for example a pneumatic cylinder, an electric cylinder or another suitable linear actuator, having a longitudinally movable control rod 16 provided at a fore end with a fork 16'.

The movable gripping member 13' is operatively connected to the control rod 16 of the linear actuator 15 by a toggle-lever mechanism 17 comprising a first 18 and a second 19 articulated connecting links, which are angularly movable with respect to each other according to an articulation axis 20, and are pivotally connected to the control rod 16 of the actuator 15, respectively to the angularly movable gripping member 13'.

In particular, the first connecting link 18 is connected to the fork 16' of the control rod 16 by a first pivotal axis 21, while the second connecting link 19 is connected to the movable gripping member 13' by a second pivotal axis 22 disposed in an eccentric point with respect to the rotational axis 14 of the gripping member 13' itself; the second pivotal axis 22 furtherly lies towards the fore end of the box-shaped body 12, in a forward position with respect to the articulation axis 20 between the connecting links 18, 19.

The device 10 also comprises guiding means for guiding the angular movement of the second connecting link 19, which are shaped to guide the connecting link 19 during the angular movement of the gripping member 13'.

Said guiding means for the second connecting link 19 comprise first guiding means 14 and second guiding means 23 disposed on opposite sides of the second connecting link 19, the second connecting link 19 being provided on the same opposite sides respectively with a first and a second contour surfaces 24, 25, shaped so as to constantly slide in contact with the first guiding means 14 and second guiding means 23 during the movement of the connecting link 19.

Preferentially, the first guiding means comprise the rotational pin 14 of the movable gripping member 13', while the second guiding means comprise an outer guide plate 23 on a side of the device 10, having a rounded edge 23' contacting with the respective shaped contour surface 25 of the second connecting link 19.

Preferentially, the first contour surface 24 disposed on the side of the connecting link 19 facing towards the rotational pin 14 of the movable gripping member 13', has a convex arched shape in the central portion, while the second contour surface 25 disposed on the opposite side of the second connecting link 19 facing towards the guide plate 23 has a concave arched shape, so as to constantly slide in contact respectively with the rotational pin 14 of the gripping member 13', and with the rounded edge 23' of the guide plate 23, during the movement of the connecting link 19.

The gripping device 10 also comprises limiting means for limiting the relative angular movement between the first connecting link 18 and the second connecting link 19, in correspondence with the operative end positions.

Preferentially, as illustrated in FIG. 2, said limiting means comprise a limit pin 26 secured to the second connecting link 19 in an intermediate position between the rotational axis 20 and the pivotal axis 22, and an elongated hollow sliding seat 27 for the limit pin 26, which extends into the first connecting link 18, the elongated seat 27 defining a first and a second stop surfaces 28, 29 for the limit pin 26, corresponding to the retaining and releasing operative end positions of the movable gripping member 13'.

In order to prevent the infiltration of dirt particles into the box-shaped body 12 of the device 10, which would jeopardise the regular operation of the device 10, the movable gripping member 13' is preferentially provided with a tubular hub 30 for closing the box-shaped body 12, which is coaxially arranged to the rotational pin 14, said hub 30 being provided with a slit 31 for the passage of the first and second connecting link 18, 19.

Closing means are also provided for closing the slit 31 made in the tubular hub 30, which comprise an arched protrusion 19' of the second connecting link 19 and the contour surface 25 of the second connecting link 19 itself, designed to slide in contact with an edge 30' of the tubular hub 30, and respectively with the rounded edge 23' of the guide plate 23 for the same connecting link 19.

The first and the second connecting link 18, 19 in general form an angle between them smaller than 180°, with its concavity facing towards the rotational pin 14 of the movable gripping member 13'; preferentially, in correspondence with the second operative position for releasing the work pieces, the first and the second connecting link 18, 19 form an angle between them comprised from 160° to 179°, in such a way as to induce the connecting links 18, 19 to angularly move always in a same direction, also avoiding jamming of the connecting links 18, 19 during their relative angular movement.

The gripping device 10 also comprises means for maintaining the movable gripping member 13' in an irreversible condition of the motion in correspondence with the operative position in which it retains the work pieces; said means for maintaining the condition of irreversibility preferentially comprise a first connecting link 18 of an elastically yielding type in an axial direction in a controlled manner, as described in the preceding patent EP 1 250 984 of the same applicant, in such a way as to enable both the automatic compensation of any thickness differences between the various work pieces without the need to make any adjustments, and the attainment of an irreversible condition of the motion, known from the same patent EP 1 250 984 which forms an integral part of this specification, in correspondence with the position in which the work pieces are retained by the movable gripping member 13'.

Preferentially, as illustrated in FIG. 2, the first connecting link 18 has a pivoting end 32 for pivoting with the fork 16' of the control rod 16, and an articulating end 33 for articulating with the second connecting link 19, respectively by the first pivotal axis 21 and by the articulation axis 20.

Said pivoting end 32 and articulating end 33 are connected to each other by means of two elastically deformable arch-shaped side arms 34, so as to allow the axial compression and lateral flexing of the connecting link 18.

The first connecting link 18 is also provided with stop elements which extend between the pivoting end 21 and the articulating end 20, which for example can be a first arm 35 and a second arm 36 provided with a roller, defining opposing stop surfaces slightly spaced apart from each other, so as to allow a controlled elastic compression of the connecting link 18.

As described in EP 1 250 984, a connecting link 18 of this kind enables the toggle-lever mechanism 17 to reach and pass a dead centre condition which corresponds to the motion irreversibility of the movable gripping member 13' for the retaining of the work pieces.

Detecting means are also provided, but not shown, for detecting the operative end positions of the movable gripping member 13', for example optical type sensors disposed in correspondence with the control rod 16, so as to detect its position, or sensors of the magnetic/inductive type disposed in correspondence with the linear actuator 15.

A gripping device 10 according to this invention therefore has a wide operative angular movement of the movable gripping member 13', of about 90°, thanks to the specific configuration of the toggle-lever mechanism 17 having double connecting link; furthermore the gripping device has limited external overall dimensions, thanks to the limited crosswise overall dimensions of the aforesaid toggle-lever mechanism and to the limited operative stroke of the control rod necessary for operating the device.

Moreover, the gripping device 10 according to the invention has a precise movement of the movable gripping member 13', due to the fact that the operative connections between the various internal control members are achieved by means of pivotal axes and articulating axes, which ensure greater precision of the movements compared to the known slot-cam couplings, at the same time limiting the frictional forces within the device and the consequent wear of the aforesaid members inside the device.

Figure 4:
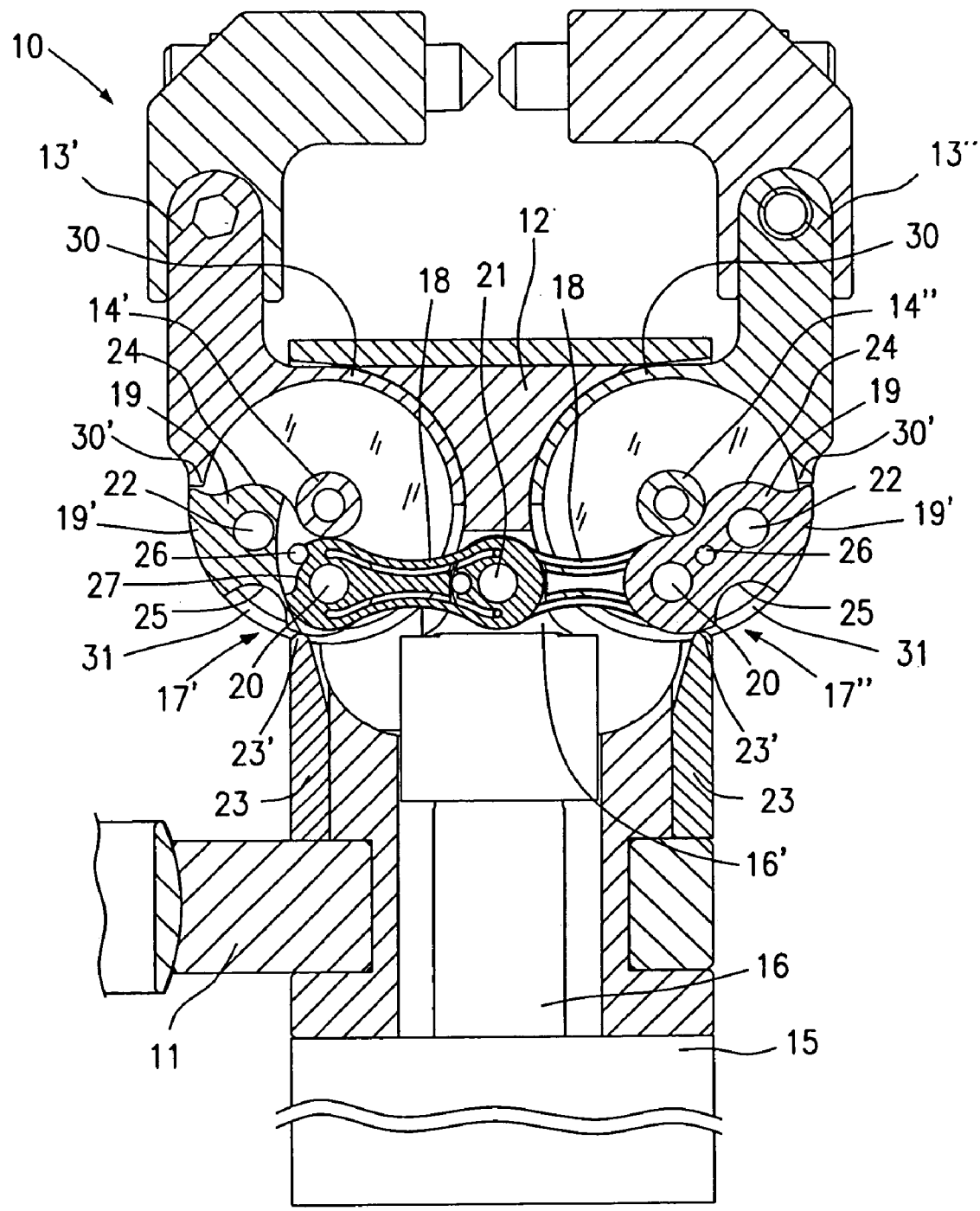
FIG. 4 shows a longitudinal cross-sectional view of a gripping device according to a second embodiment of the invention, having two movable gripping members.

FIG. 4 illustrates a second embodiment for the gripping device 10 according to the invention.

This figure, in which the same reference numbers have been used to indicate similar or equivalent parts, shows a gripping device 10 comprising a box-shaped body 12, which extends according to a longitudinal axis, which supports a first and a second angularly movable gripping members 13', 13", by means of respective rotational pins 14', 14".

Each of the movable gripping members 13', 13" is operatively connected to a control rod 16 of a linear actuator 15 by means of a respective toggle-lever mechanism 17', 17", having characteristics similar to those described above for the gripping device 10 having a single movable gripping member 13', according to the first embodiment of the invention.

The first movable gripping member 13' with the respective toggle-lever mechanism 17', and the second gripping member 13" with the respective toggle-lever mechanism 17" are disposed at a fore end of the box-shaped body 12 on opposite sides with respect to the longitudinal axis of the body 12.

With regard to the characteristics of the means for guiding and limiting the angular movement of the connecting links forming the toggle-lever mechanisms 17', 17", and of the means for closing the box-shaped body 12 in correspondence with the gripping members 13', 13", reference is made to that described above for the case of the gripping device with a single movable gripping member, in that they have similar or equivalent characteristics.

What has been described and shown with reference to the accompanying drawings has been given purely by way of example in order to illustrate the general features of the invention, and several of its preferential embodiments; therefore other modifications and variations to the gripping device for gripping work pieces are possible, without thereby deviating from the scope of the claims.

I claim:

1. A gripping device for gripping work pieces, connectable to a robotized manipulating system, of the type comprising:
   a box-shaped body;
   a first and a second gripping members, at least one of which being supported by the box-shaped body to be angularly movable between a first and a second operative end positions, according to a rotational axis; and
   a linear actuator having a longitudinally movable control rod, said at least one angularly movable gripping member being operatively connected to the control rod of the linear actuator by a toggle-lever mechanism,
   wherein said toggle-lever mechanism comprises:
   a first and a second articulated connecting links, angularly movable with respect to each other, said first and second connecting links being pivotally connected to the control rod of the actuator, respectively to said at least one angularly movable gripping member, said second connecting link being connected to said at least one angularly movable gripping member in an eccentric point with respect to its rotational axis;
   wherein guiding means are provided for guiding the angular movement of the second connecting link, said guiding means being shaped to guide said connecting link during the angular movement of the gripping member;
   wherein limiting means are provided for limiting the relative angular movement between said first and said second connecting links, in correspondence with said operative end positions; and
   wherein said guiding means for guiding the angular movement of the second connecting link comprise first and second guiding means disposed on opposite sides of the second connecting link, the second connecting link being provided on said opposite sides respectively with a first and a second contour surfaces, shaped so as to constantly slide in contact with said first and second guiding means during the movement of the connecting link.

2. The gripping device according to claim 1, in which said at least one angularly movable gripping member comprises a rotational pin supported by the box-shaped body, wherein said first guiding means for guiding the second connecting link comprise the rotational pin of the gripping member, and wherein said second guiding means for guiding the second connecting link comprise an outer guide plate on a side of the device, the guide plate having a rounded edge contacting with the respective shaped contour surface of said second connecting link.

3. The gripping device according to claim 2, wherein the second connecting link has on said opposite sides a first and a second arched contour surfaces shaped so as to constantly slide in contact with said rotational pin of said at least one angularly movable gripping member, and respectively with the rounded edge of said guide plate, during the movement of the connecting link.

4. The gripping device according to claim 1, wherein said limiting means for limiting the relative angular movement between said first and second connecting links comprise a limit pin secured to the second connecting link, and an elongated hollow sliding seat for said limit pin, which extends in said first connecting link, said elongated seat defining a first and a second stop surfaces for said limit pin, corresponding to said operative end positions of said at least one angularly movable gripping member.

5. The gripping device according to claim 1, wherein said at least one angularly movable gripping member is provided with a tubular hub for closing the box-shaped body, said tubular hub being provided with a slit for the passage of said first and second connecting link, and wherein closing means are provided for closing said passage slit.

6. The gripping device according to claim 5, characterised in that said closing means for closing the slit of the tubular hub comprise an arched protrusion of the second connecting link and a contour surface of the second connecting link designed to slide in contact with an edge of the tubular hub, and respectively with said guiding means for the connecting link.

7. The gripping device according to claim 6, wherein said guiding means comprise an outer guide plate on a side of the device, the guide plate having a rounded edge contacting with the respective shaped contour surface of said second connecting link.

8. The gripping device according to claim 1, in which said at least one angularly movable gripping member moves between a first operative position and a second operative position for respectively retaining and releasing a work piece, wherein said first and second connecting link, in correspondence with the second operative releasing position, form an angle between them comprised from 160° to 179°.

9. The gripping device according to claim 1, comprising means for maintaining said at least one angularly movable gripping member in an irreversible condition of motion in correspondence with the operative retaining position for the work pieces.

10. The gripping device according to claim 9, wherein said means for maintaining said at least one angularly movable gripping member in an irreversible condition comprise a first connecting link of the elastically yielding type in an axial direction in a controlled manner.

11. The gripping device according to claim 1, comprising an angularly movable gripping member the at least one fixed gripping member, supported by said box-shaped body.

12. The gripping device according to claim 1, in which the box-shaped body has a longitudinal axis, the gripping device comprising a first and a second angularly movable gripping member supported by said box-shaped body, each of said movable gripping members being operatively connected to the control rod of the linear actuator by a respective toggle-lever mechanism, said first and second movable gripping members and the respective toggle-lever mechanisms being disposed on opposite sides of the box-shaped body with respect to the longitudinal axis of the body.

* * * * *